United States Patent
Spoerl et al.

(10) Patent No.: US 10,502,313 B2
(45) Date of Patent: Dec. 10, 2019

(54) SELECTOR LEVER FOR AN AUTOMATIC TRANSMISSION OR AN AUTOMATED MANUAL TRANSMISSION OF A MOTOR VEHICLE

(71) Applicant: ZF Friedrichshafen AG, Friedrichshafen (DE)

(72) Inventors: Peter Spoerl, Ravensburg (DE); Walter Hecht, Ravensburg (DE); Franz-Josef Schuler, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 710 days.

(21) Appl. No.: 15/026,808

(22) PCT Filed: Sep. 15, 2014

(86) PCT No.: PCT/EP2014/069577
§ 371 (c)(1),
(2) Date: Apr. 1, 2016

(87) PCT Pub. No.: WO2015/049101
PCT Pub. Date: Apr. 9, 2015

(65) Prior Publication Data
US 2016/0280226 A1    Sep. 29, 2016

(30) Foreign Application Priority Data

Oct. 1, 2013 (DE) .................. 10 2013 219 924

(51) Int. Cl.
*F16H 59/12* (2006.01)
*F16H 59/02* (2006.01)
(Continued)

(52) U.S. Cl.
CPC ............. *F16H 59/12* (2013.01); *B60W 10/06* (2013.01); *B60W 10/11* (2013.01); *B60W 30/18* (2013.01);
(Continued)

(58) Field of Classification Search
CPC ........ F16H 59/12; F16H 59/10; F16H 59/105; F16H 59/0217; F16H 2061/223; B60W 10/11; B60W 10/06
See application file for complete search history.

(56) References Cited

U.S. PATENT DOCUMENTS

| 2008/0282829 A1* | 11/2008 | Giefer | ................. F16H 59/0217 |
| | | | 74/473.12 |
| 2011/0277578 A1* | 11/2011 | McGuire | ............. F16H 59/0278 |
| | | | 74/473.3 |

(Continued)

FOREIGN PATENT DOCUMENTS

| DE | 197 47 269 A1 | 4/1999 |
| DE | 100 59 678 A1 | 6/2001 |

(Continued)

OTHER PUBLICATIONS

International Search Report dated Oct. 12, 2014 in International Application No. PCT/EP2014/069577 (English and German languages) (6 pp.).

(Continued)

*Primary Examiner* — Erin D Bishop
(74) *Attorney, Agent, or Firm* — Brinks Gilson & Lione

(57) ABSTRACT

A selector lever for a transmission of a vehicle may include a monostable control element. Actuation of the monostable control element, without moving the selector lever, may triggers engagement of a parked position of the transmission when the transmission is not in the parked position and the drive motor is running. Further, actuation of the monostable (Continued)

control element may trigger a start process of the drive motor when the drive motor is off. Further, actuation of the monostable control element may trigger a shutdown process of the drive motor when the transmission is in the parked position and the drive motor is in on.

14 Claims, 1 Drawing Sheet

(51) Int. Cl.
*F16H 59/10* (2006.01)
*F16H 63/50* (2006.01)
*B60W 10/06* (2006.01)
*B60W 10/11* (2012.01)
*B60W 30/18* (2012.01)

(52) U.S. Cl.
CPC ....... *F16H 59/0217* (2013.01); *F16H 59/105* (2013.01); *F16H 63/50* (2013.01)

(56) References Cited

U.S. PATENT DOCUMENTS

| | | | |
|---|---|---|---|
| 2013/0066539 A1* | 3/2013 | Leone | F02D 29/02 |
| | | | 701/113 |
| 2013/0158838 A1* | 6/2013 | Yorke | B60W 10/06 |
| | | | 701/103 |

FOREIGN PATENT DOCUMENTS

| | | |
|---|---|---|
| DE | 100 62 891 A1 | 8/2001 |
| DE | 100 02 441 B4 | 12/2006 |
| DE | 10 2005 044 254 A1 | 3/2007 |
| DE | 10 2007 037706 A1 | 2/2009 |
| DE | 10 2009 001 376 A1 | 9/2010 |
| EP | 1 770 311 A1 | 4/2007 |

OTHER PUBLICATIONS

German Search Report dated Jun. 11, 2014 for German Patent Appliction No. 10 2013 219 924.4 (German language) (9 pp.).

* cited by examiner

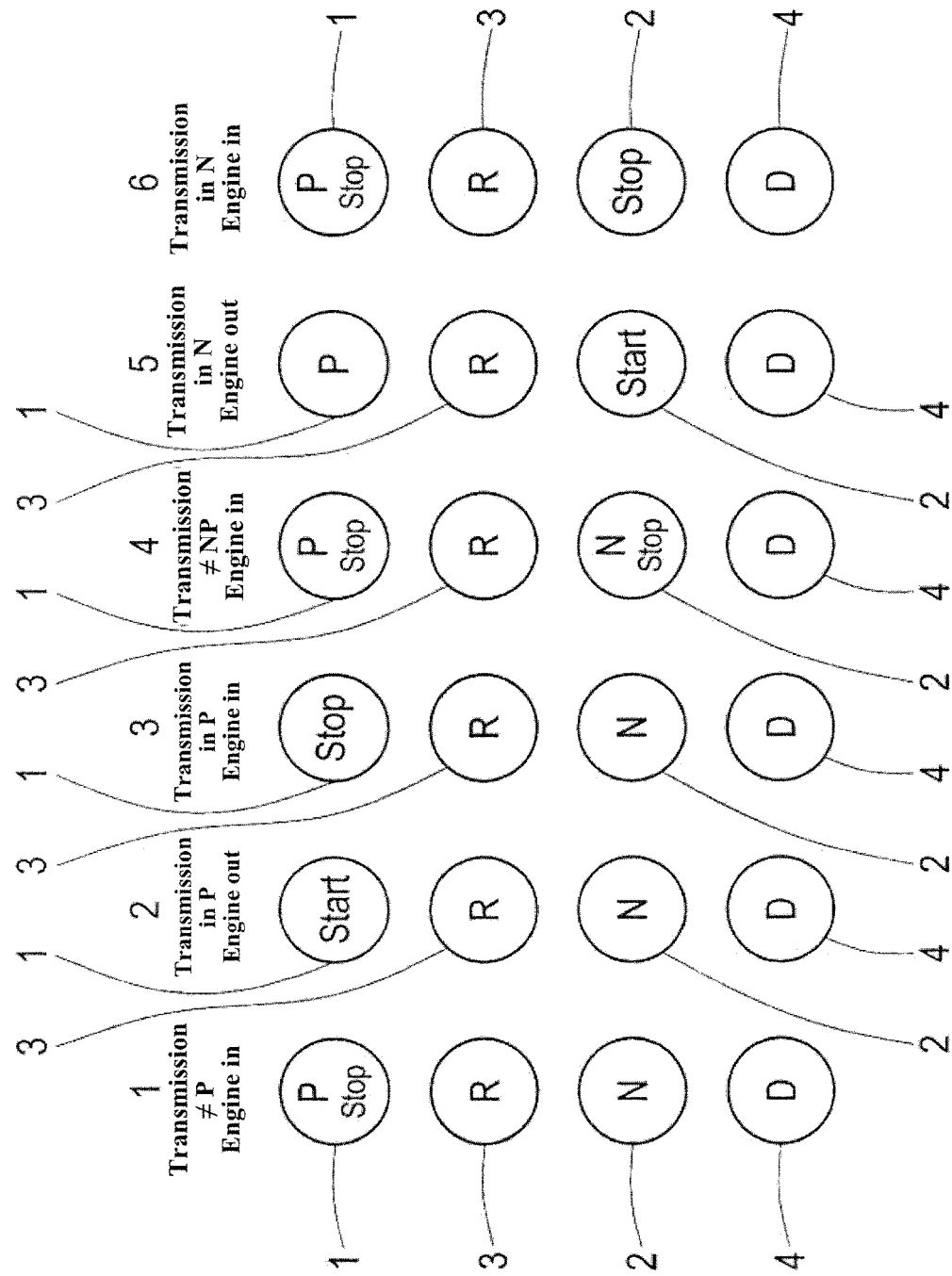

SELECTOR LEVER FOR AN AUTOMATIC TRANSMISSION OR AN AUTOMATED MANUAL TRANSMISSION OF A MOTOR VEHICLE

RELATED APPLICATIONS

This application is a filing under 35 U.S.C. § 371 of International Patent Application PCT/EP2014/069577, filed Sep. 15, 2014, and claims the priority of German Patent Application 10 2013 219 924.4, filed Oct. 1, 2013. These applications are incorporated by reference herein in their entireties.

BACKGROUND

It is known to actuate a start/stop button or a key for starting and stopping an internal combustion engine of a motor vehicle, wherein the desired gear of the automatic transmission is engaged by the activation of a selector lever. Using the selector lever, usually the four positions P, R, N, D (P=park, parking lock engaged, R=reverse, reverse gear, N=neutral, D=drive) can be selected, wherein in modern vehicles the position P is assigned a separate monostable control element of the selector lever, which is not permanently actuated and which is preferably designed as a button. In addition, also the position N can be assigned a separate monostable control element of the selector lever, which can be designed as a button.

Further, the selector lever can be configured as a monostable control element, wherein for selecting the position P or N, the selector lever is displaced from a predetermined position in a direction assigned to position P or N and then returns again to the starting position.

Due to the fact that for starting or stopping the combustion engine and engaging the desired gear two separate devices must be operated, which is known from the prior art, the operating concept is relatively confusing.

In DE 100 59 678 A1 is shown a vehicle starting system, which comprises a gear selector that is movable to switch from a driving state in a plurality of driving states to a starting state to cause the starting of the vehicle engine. In this case, the gear selector is moved to start the combustion engine of the vehicle. This is combining the functions of a conventional selector lever of an automatic transmission and a conventional ignition system.

Furthermore, from DE 100 62 891 A1 is known a starting/driving system for a vehicle with a selector assembly including a driving/gear selector to choose from a variety of driving states or gears, driver authorization means and a safety system for performing authorization check of the authorization means. The known system further comprises a lock, which provides the initially partial and later full release of the driving/gear selector, wherein the initial movement of the selector triggers the authorization check to allow the subsequent complete release of the selector to trigger an engine start in the current selector position. Here, the engine start is triggered by a movement of the selector into a driving position.

BRIEF DESCRIPTION OF THE DRAWINGS

FIG. 1 shows six views of a selector lever in accordance with the embodiments described below.

DETAILED DESCRIPTION

The current embodiments provide a selector lever for an automatic transmission or an automated manual transmission of a motor vehicle, in which a start/stop function for the drive motor of the vehicle is integrated.

Furthermore, a method for starting and stopping the drive motor is provided by using an inventively designed selector lever.

Thus, a selector lever for an automatic transmission or an automated manual transmission of a motor vehicle is proposed, wherein the selector lever comprises a separate monostable control element assigned to the position P of the transmission, in which by actuating the monostable control element assigned to the position P, in dependence on the currently engaged position and the state of a drive motor of the vehicle, a start or shutdown process of the drive motor of the vehicle can be triggered without any movement of the selector lever.

Preferably, a start or shutdown process of the drive motor can be triggered when the required or current position in the transmission is P.

In the event that the selector lever comprises a separate monostable control element assigned to the gear position N, it can be inventively provided that by actuating the monostable control element assigned to the position N as a function of the currently engaged position and the state of the drive motor, a start or shutdown process of the drive motor can be triggered. Here, by actuating the monostable control element assigned to the position N operation of the position N associated control element, a start or shutdown process of the drive motor can be preferably triggered when the required or current position in the transmission is N.

The monostable control elements are preferably configured as a button. This provides the advantage that the driver can start or stop the drive motor by pressing a buttons in the usual manner. The selector lever is not moved.

The current embodiments provide a simple and convenient operating concept, because the selector lever as a central control element is always easily accessible and is located in the focus of the driver. This also results in the advantage that the security is increased, because the drive motor can be quickly turned off.

If the selector lever is displaced from a predetermined position in the direction assigned to a position P for engaging position P, and then returns again to the starting position, or if the selector lever is displaced from a predetermined position in the direction assigned to the position N for engaging position N and then returns again to the starting position, by actuating the selector lever for engaging the position P or position N, in dependence on the currently engaged position and the state of the drive motor, a starting or shutdown process of the drive engine of the vehicle can be triggered. Preferably, a starting or shutdown process of the drive motor can be triggered when the required or current position in the gear is P or N.

Referring to FIG. 1, for the case that the selector lever comprises a separate monostable control element configured as a button control element for the position P, or that the selector lever comprises a separate control element configured as a button control element for the position P and a separate monostable control element configured as a button for the position N. In FIG. 1, the monostable control element assigned to position P is provided with the reference numeral 1, wherein the monostable control element assigned to the position N is provided with the reference numeral 2. In the example shown, the gear positions R and D can be selected by means of further monostable control elements 3, 4. The control elements 1, 2, 3, 4 are preferably designed as a button.

In the left column (column 1) is shown the situation in the event that the selector lever comprises a separate monostable control element 1 for the position P, for example, a button, and the transmission of the vehicle with the drive engine running is not in the position P, i.e. the transmission is in position R, N or D. For transmissions with other positions, such as S for a sporty driving style, the transmission can be in one of these other positions.

The position P can be engaged by a short actuation of the monostable control element 1 assigned to the position P, wherein the time of the actuation must not exceed a predetermined value, wherein the drive motor continues to run in this case. If the monostable control element 1 assigned to the position P is actuated for a longer time, the position P is engaged and subsequently the drive motor is shut down. Here, the position P is engaged and the drive motor is shut down if the time of actuation of the control element 1 exceeds a predetermined duration.

Advantageously, if with the drive engine running the transmission of the vehicle is not in the position P, the control element 1 is illuminated with "P/Stop" or other similar expression, which indicates to the driver the described double configuration of the monostable control element 1 assigned to the position P and the two ways of actuation. Here, the display is preferably integrated in the control element 1. This display can also be arranged at another suitable position in the selector lever or next to the selector lever.

In column 3 is shown the situation when the transmission of the vehicle with the drive engine running is in position P. Here, the drive motor is switched off by actuation of the monostable control element assigned to the position P. Preferably, the monostable control element 1 assigned to position P is illuminated with "Stop" to inform the driver of this functionality. Here, the display is preferably integrated in the control element 1. This display can also be arranged at another suitable position in the selector lever or next to the selector lever.

In the event that the selector lever comprises a separate monostable control element 2 for the position N, the described double assignment of the monostable control element 1 assigned to the position P can be extended to the monostable control element 2 assigned to position N, in dependence on the currently engaged position and state of the drive motor of the vehicle.

Column 4 of FIG. 1 corresponds to the situation in which the transmission of the vehicle with the drive motor not running is not in the position N or P. Here, in addition to the functionality of the monostable control element 1 assigned to the position P described with reference to column 1, as a function of the actuation duration, the position N can be engaged by a short actuation of the monostable control element 2 assigned to the position N, wherein the time of actuation must not exceed a predetermined value and wherein the drive motor continues to run in this case. If the monostable control element 2 assigned to the position N is actuated for a longer time, which exceeds a predetermined value, the position N is engaged and the drive motor is shut off. The described functionality of the monostable control element 2 assigned to the position N is also available when the transmission is in the position P. In this case, the control element 1 assigned to the position P is illuminated with the term "Stop".

This is particularly advantageous when after switching off the drive motor, the driver would like to have the position N and not the position P, which can be the case, for example, when visiting a car wash or a workshop. As seen from FIG. 1, the control elements 1, 2 are illuminated for the position P and the position N with "P/Stop" or "N/Stop" or another similar expression, which indicates to the driver the described double assignment of the monostable control elements 1, 2 assigned to the position P and the position N and the two ways of operation. Here, the display is preferably integrated in the control elements 1, 2. The display can also be arranged in another suitable position in the selector lever or next to the selector lever.

In the event that the position N is engaged and the drive motor is turned off, the position N is held until the position P is engaged by the driver or until the automatic engaging of the position P after a predetermined N holding phase.

Column 5 shows the situation in the event that the selector lever comprises a separate monostable control element 2 for the position N, for example a button, and with the engine switched off, the transmission of the vehicle is in the position N. In this situation by actuation of the control element 2 for the position N, the starting process of the drive motor is triggered. It is preferred here that the control element 2 is illuminated for the position N with "Start" or a similar expression to advise the driver of this functionality. It is preferred here that the control element 2 is illuminated for the position N with "Start" or a similar expression to advise the driver of this functionality. Here, as explained above, the display may be integrated in the control element 2, but in further embodiments it may be located at another suitable position in the selector lever or next to the selector lever.

Column 6 illustrates the situation, when the transmission of the vehicle is in the position N with the drive motor running. Here, the drive motor is switched off by actuation of the monostable control element 2 assigned to the position N. Preferably, in this situation, the position of the monostable control element 2 assigned to the position N is illuminated with "Stop" or a similar expression to advise the driver of this functionality. It can also be displayed at another suitable position in the selector lever or next to the selector lever. Furthermore, the monostable control element 1 assigned to the position P is illuminated "P/Stop" or a similar expression to advise the driver of the functionality of this control element described with reference to column 1.

In the event that the selector lever for the positions P and N comprises multistable control elements, in which P or N is permanently transmitted and it cannot distinguish between a short or long operation, according to at least one embodiment, it can be specified by additional operation of another control element at the selector lever or by an operating direction on an additional display on the selector lever whether to start or stop the drive motor. This function is supported and made visible on the lever selector or next to it.

For example, the selector lever position P, which is usually the frontmost selector lever position, can be equipped with an additional sensor, which after the selector lever has been pushed forward detects the driver's request to start/stop according to the functionality already described. Here, the driver can be advised by an additional display "Start" or "Stop", which function he triggers with the selector lever movement.

REFERENCE NUMERALS

1 Control element for position P
2 Control element for position N
3 Control element for position R
4 Control element for position D

We claim:

1. A selector lever for an automatic or automated manual transmission that is connected to a drive motor of a motor vehicle, the selector lever comprising:
   a first monostable control element, wherein an actuation of the first monostable control element, without moving the selector lever, triggers engagement of a parked position of the transmission when the transmission is not in the parked position and the drive motor is running, triggers a start process of the drive motor when the drive motor is off, and triggers a shutdown process of the drive motor when the transmission is in the parked position and the drive motor is in on.

2. The selector lever of claim 1, wherein the first monostable control element includes a button.

3. The selector lever of claim 1, further comprising a second monostable control element, wherein the second monostable control element is configured such that actuating the second monostable control element triggers at least one of engagement of a neutral position of the transmission, the start process of the drive motor, and the shutdown process of the drive motor.

4. The selector lever of claim 3, wherein the start process or the shutdown process of the drive motor is triggered when the transmission is in the neutral position and when the second monostable control element is actuated.

5. The selector lever of claim 3, wherein the second monostable control element includes a button.

6. The selector lever of claim 3, wherein at least one of the first monostable control element and the second monostable control element includes an adjustable display configured to advise a driver of the functionality of triggering the start process or the shutdown process of the drive motor upon actuating the respective first monostable control element or second monostable control element.

7. The selector lever of claim 3,
   wherein when the transmission is not in the neutral position and when the drive motor is running, the selector lever is configured such that the transmission is adjusted to the neutral position in response to actuating the second monostable control element for a third period of time being less than a second predetermined period of time, and wherein when the second monostable control element is actuated for a fourth period of time that exceeds the second predetermined period of time, the transmission is adjusted to the neutral position and subsequently the shutdown process of the drive motor is triggered,
   wherein when the transmission is in the neutral position and when the drive motor is turned off, the selector lever is configured such that the start process of the drive motor is triggered by actuating the second monostable control element,
   wherein when the transmission is in the neutral position and when the drive motor is running, the selector lever is configured such that the shutdown process of the drive motor is triggered by actuating the first monostable control element,
   wherein when the drive motor is running and the transmission is not in the parked position, the selector lever is configured such that the transmission is adjusted to the parked position in response to actuating the first monostable control element for a first period of time being less than a predetermined period of time, and wherein when the first monostable control element is actuated for a second period of time that exceeds the predetermined period of time, the selector lever is configured such that the transmission is adjusted to the parked position and subsequently the shutdown process of the drive motor is triggered,
   wherein when the transmission is in the parked position and when the drive motor is turned off, the selector lever is configured such that the start process of the drive motor is triggered by actuating the first monostable control element, and
   wherein when the transmission is in the parked position and when the drive motor is running, the selector lever is configured such that the shutdown process of the drive motor is triggered by actuating the first monostable control element.

8. The selector lever of claim 1,
   wherein when the drive motor is running and the transmission is not in the parked position, the selector lever is configured such that the transmission is adjusted to the parked position in response to actuation of the first monostable control element for a first period of time being less than a predetermined period of time, and wherein when the first monostable control element is actuated for a second period of time that exceeds the predetermined period of time, the selector lever is configured such that the transmission is adjusted to the parked position and subsequently the shutdown process of the drive motor is triggered.

9. A method for starting or shutting down a drive motor of a motor vehicle using a selector lever for an automatic or automated manual transmission that is connected to the drive motor of the motor vehicle, the method comprising:
   actuating a monostable control element of the selector lever,
   wherein actuating the monostable control element, without moving the selector lever, triggers engagement of a parked position of the transmission when the transmission is not in the parked position and the drive motor is running, triggers a start process of the drive motor when the drive motor is off, and triggers a shutdown process of the drive motor when the transmission is in the parked position and the drive motor is in on.

10. The method of claim 9, the method comprising:
    actuating the monostable control element for a period of time being less than a predetermined period of time when the drive motor is running and the transmission is not in the parked position to trigger the adjustment of the transmission to the parked position.

11. The method of claim 9, the method comprising:
    actuating the monostable control element for a period of time that exceeds a predetermined period of time when the drive motor is running and the transmission is not in the parked position to trigger the adjustment of the transmission to the parked position and to subsequently trigger the shutdown process of the drive motor.

12. The method of claim 9, the method comprising:
    actuating the monostable control element when the transmission is in the parked position and when the drive motor is turned off to trigger the start process of the drive motor.

13. The method of claim 9, the method comprising:
    actuating the monostable control element when the transmission is in the parked position and when the drive motor is running to trigger the shutdown process of the drive motor.

14. A method for starting or shutting down a drive motor of a motor vehicle using a selector lever for an automatic or automated manual transmission that is connected to the drive motor of the motor vehicle, wherein the selector lever has a first monostable control element and a second monostable control element, the method comprising:
- actuating the second monostable control element, wherein depending on at least one of a position of the transmission and a state of the drive motor, actuating the second monostable control element triggers engagement of a neutral position of the transmission, a start process of the drive motor, or a shutdown process of the drive motor; and
- actuating the first monostable control element,
- wherein an actuation of the first monostable control element, without moving the selector lever, triggers engagement of a parked position of the transmission when the transmission is not in the parked position and the drive motor is running, triggers the start process of the drive motor when the drive motor is off, and triggers the shutdown process of the drive motor when the transmission is in the parked position and the drive motor is in on.

* * * * *